United States Patent
Geurtz

(10) Patent No.: US 7,976,618 B2
(45) Date of Patent: Jul. 12, 2011

(54) MOTOR VEHICLE

(75) Inventor: Heinz-Jürgen Geurtz, Althengstett-Neuhengstett (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 292 days.

(21) Appl. No.: 12/276,474

(22) Filed: Nov. 24, 2008

(65) Prior Publication Data

US 2009/0133580 A1    May 28, 2009

(30) Foreign Application Priority Data

Nov. 24, 2007   (DE) .......................... 10 2007 056 675

(51) Int. Cl.
*B01D 53/04*    (2006.01)
*F02M 25/08*    (2006.01)
*B60K 15/035*   (2006.01)

(52) U.S. Cl. ............ 96/131; 96/151; 55/385.3; 123/519

(58) Field of Classification Search ................ 96/121, 96/131, 132, 147, 151; 95/146; 55/385.3, 55/490, 492, 350.1; 123/518, 519
See application file for complete search history.

(56) References Cited

U.S. PATENT DOCUMENTS

| | | | | |
|---|---|---|---|---|
| 4,793,839 A * | 12/1988 | Hayashida et al. | ............ | 96/130 |
| 5,058,693 A * | 10/1991 | Murdock et al. | ............ | 180/69.4 |
| 5,060,620 A * | 10/1991 | Oslapas | ........................ | 123/519 |
| 5,337,721 A * | 8/1994 | Kasuya et al. | ................ | 123/519 |
| 5,564,398 A * | 10/1996 | Maeda et al. | ................ | 123/520 |
| 5,592,922 A | 1/1997 | Denz | | |
| 5,702,125 A * | 12/1997 | Nakajima et al. | ............ | 280/834 |
| 5,868,428 A * | 2/1999 | Ishikawa | ........................ | 280/834 |
| 6,395,072 B2 * | 5/2002 | Miura et al. | .................... | 96/133 |
| 6,503,301 B2 * | 1/2003 | Uchino et al. | ................ | 96/132 |
| 6,652,629 B2 | 11/2003 | Wolff et al. | | |
| 6,695,896 B2 * | 2/2004 | Hara et al. | ...................... | 96/121 |
| RE38,844 E * | 10/2005 | Hiltzik et al. | ................... | 95/146 |
| 7,059,306 B2 * | 6/2006 | Reddy | .......................... | 123/518 |
| 7,118,716 B2 * | 10/2006 | Meiller et al. | ............... | 422/180 |
| 7,255,094 B2 * | 8/2007 | King | .............................. | 123/519 |
| 7,713,337 B2 * | 5/2010 | Toyoda et al. | .................. | 96/131 |
| 2007/0215123 A1* | 9/2007 | Ito et al. | ........................ | 123/519 |

FOREIGN PATENT DOCUMENTS

| | | |
|---|---|---|
| DE | 44 08 869 A1 | 9/1995 |
| DE | 101 50 062 B4 | 6/2005 |
| JP | 6307302 A | 11/1994 |
| JP | 8025985 A | 1/1996 |

OTHER PUBLICATIONS

German Patent and Trademark Office Search Report, dated Oct. 2, 2008.

* cited by examiner

*Primary Examiner* — Frank M Lawrence

(57) ABSTRACT

A motor vehicle has a filter device for purifying untreated gases. The filter device has a filter housing and at least one filter element, in particular an adsorber element, which is arranged therein, with an auxiliary filter that is positioned outside and above the filter housing being provided. The auxiliary filter, which is disposed in an auxiliary filter housing, has at least one auxiliary filter element which is connected in a communicating fashion to and in series with the filter element in the filter housing.

8 Claims, 1 Drawing Sheet

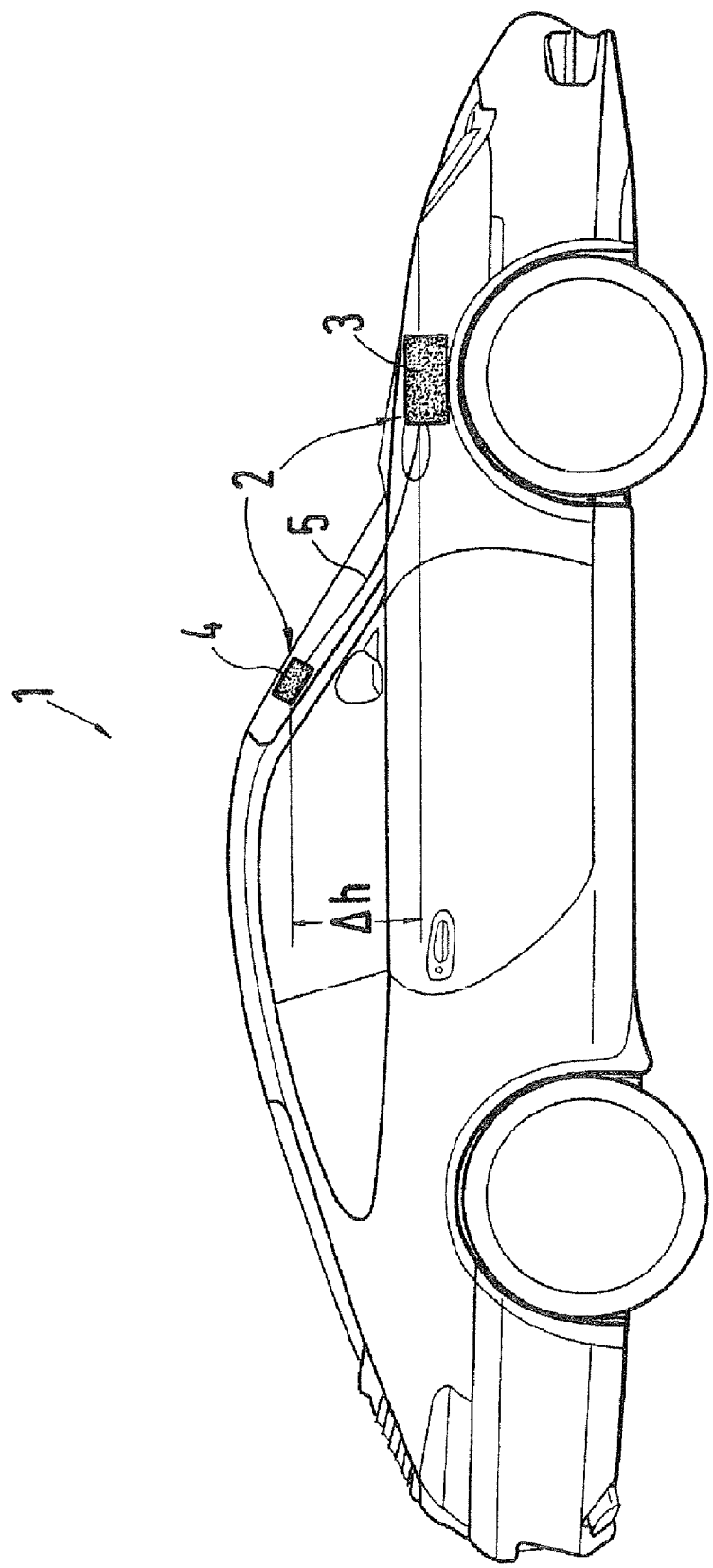

MOTOR VEHICLE

CROSS-REFERENCE TO RELATED APPLICATION

This application claims the priority, under 35 U.S.C. §119, of German application DE 10 2007 056 675.3, filed Nov. 24, 2007; the prior application is herewith incorporated by reference in its entirety.

BACKGROUND OF THE INVENTION

Field of the Invention

The present invention relates to a motor vehicle having a filter device for the purification of untreated gas.

As a result of ever more stringent environmental requirements, in particular in the USA, many manufacturers of tank ventilation systems are faced with problems. Known tank ventilation systems are for example fitted with an activated charcoal packed bed filter through which the air that is displaced out of the tank flows during re-fueling of the motor vehicle. During re-fueling, the activated charcoal packed bed filter therefore absorbs the fuel in the displaced air and discharges the fuel by desorption during driving operation, during which the filter is traversed by flow in the opposite direction. A problem, however, is a shutdown of the motor vehicle immediately after re-fueling, such that a backflush of the activated charcoal packed bed filter is prevented and fuel continues to be absorbed into the filter. If the absorption limit is reached, then further hydrocarbon constituents diffuse through the activated charcoal packed bed filter and undesirably pass into the environment. This must be prevented.

German patent DE 101 50 062 B4, corresponding to U.S. Pat. No. 6,652,629, discloses a filter device having a multi-part activated charcoal molded body. The multiple parts are disposed in series in the flow direction in a sealing element embodied as a shrink hose, with the shrink hose having a radially narrowing portion in each case between the individual activated charcoal molded bodies, as a result of which the individual activated charcoal molded bodies are held in position. On account of the flexible shrink hose, the filter device can be adapted in a relatively simple manner with regard to its installation position in the motor vehicle. Provided at the longitudinal end side of the filter device are connecting elements, by which a connection can take place for example to a fuel tank.

SUMMARY OF THE INVENTION

It is accordingly an object of the invention to provide a motor vehicle which overcomes the above-mentioned disadvantages of the prior art devices of this general type, in which a discharge of hydrocarbon constituents out of a fuel tank into the environment can be reliably prevented.

With the foregoing and other objects in view there is provided, in accordance with the invention, a motor vehicle. The motor vehicle contains a filter device for purifying untreated gas. The filter device has a filter housing and at least one filter element disposed in the filter housing. The filter device further has an auxiliary filter housing with an auxiliary filter positioned outside and above the filter housing. The auxiliary filter, disposed in the auxiliary filter housing, has at least one auxiliary filter element connected in a communicating fashion to and in series with the filter element in the filter housing.

The invention is based on the general concept of forming a filter device for the purification of untreated gas, in particular for the purification of air that is laden with hydrocarbons, to be of a modular design, with the individual modules being disposed in series in the flow direction and being arranged at different heights in the motor vehicle. Here, the filter device has a filter housing and at least one filter element, in particular an adsorber element, which is arranged therein, with an auxiliary filter that is positioned outside and above the filter housing being provided. The auxiliary filter, in an auxiliary filter housing, has at least one auxiliary filter element which is connected in a communicating fashion to and in series with the filter element in the filter housing. The communicating connection between the filter element and the auxiliary filter element which is situated higher than the filter element forms a buffer, that is to say in regulation terms a time function element, which prevents or at least dampens a penetration of hydrocarbon constituents through the filter device. The separate, and higher, arrangement of the auxiliary filter first increases the absorption volume of the filter device and second at least delays in terms of time, but at best completely prevents, a penetration of hydrocarbon constituents through the filter device, that is to say through the filter element and through the auxiliary filter element. By the motor vehicle according to the invention, it is therefore possible to meet the ever more stringent environmental requirements without problems, with an absorption volume of the filter element and of the auxiliary filter element naturally being adapted to vehicle-specific requirements.

In one advantageous refinement of the motor vehicle, at least the one filter element and the at least one auxiliary filter element has activated charcoal for filtering hydrocarbons. Activated charcoal is an extremely fine-grained charcoal with a very large internal surface area that is used as an adsorption device in filter technology. Activated charcoal is composed predominantly of charcoal with a highly porous structure, with the pores being connected to one another in a communicating fashion, similarly to a sponge. With an internal surface area of 300 to 2000 $m^2/g$ of activated charcoal, it is possible to obtain large filter capacities even with relatively small filter body volumes. Here, it is greatly advantageous that activated charcoal is a so-called regenerative filter material which can be regenerated for example by back flushing, and which thereby has an extremely long service life. At the same time, activated charcoal filter elements of this type can be produced in a cost-effective manner and in virtually any required shape.

The filter housing with the filter element is expediently disposed in a rear region or in a front region of the motor vehicle, while the auxiliary filter is disposed there-above in an A-pillar or C-pillar of the motor vehicle. In this way, it is possible to easily realize the height difference between the individual filter elements, which is required for the buffering or preventing the penetration, wherein the connection between the filter housing with the filter element and the auxiliary filter housing with the auxiliary filter element can be produced by a flexible hose, and thereby in an extremely simple and cost-effective manner. Here, the spacing between the filter element and the auxiliary filter element, in particular the vertical spacing between the two filter elements and the length of the connecting hose which is arranged between the two filter elements, determines both the absorption volume of the filter device according to the invention and also its penetration behavior. As great as possible a spacing between the filter element and the auxiliary filter element is therefore desirable in order first to be able to realize a greater absorption volume and second to be able to delay at least for a long time a penetration of hydrocarbon constituents through the auxiliary filter elements.

In a further advantageous embodiment of the solution according to the invention, the filter housing has a plug-in frame with at least one plug-in slot into which at least one exchangeable filter element can be plugged. In this way, it is possible to determine the filter capacity of the filter device by a different and freely selectable number of filter elements which are plugged in a simple manner into the plug-in slots in the filter housing and which are thereby connected in series with one another. If a large filter capacity is desired, a greater number of filter elements which are plugged into the filter housing in series in the flow direction are required than if a relatively small filter capacity is desired. Conceivable here is in particular a modular system with an identical filter housing for a plurality of motor vehicle variants, into which filter housing a different number of filter elements are plugged depending on the motor vehicle or engine variant, whereby the filter capacity of the filter device is directly influenced. The optional arrangement of one or more filter elements in the filter housing permits particularly flexible adaptation of the filter device to different motor vehicle variants, such that the filter device can be used in the same design for a plurality of motor vehicle variants, as a result of which the number of parts can be reduced and storage and logistics costs can be saved.

Further important features and advantages of the invention can be gathered from the subclaims, from the drawing and from the associated description of the figures on the basis of the drawing.

It is self-evident that the features explained above and the features yet to be explained below can be used not only in the respectively specified combination but rather also in other combinations or individually without departing from the scope of the present invention.

Other features which are considered as characteristic for the invention are set forth in the appended claims.

Although the invention is illustrated and described herein as embodied in a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL
VIEWS OF THE DRAWING

The single FIGURE of the drawing is a diagrammatic, side view of a motor vehicle having a filter device according to the invention.

DETAILED DESCRIPTION OF THE INVENTION

Referring now to the single FIGURE of the drawing in detail thereof, there is shown a motor vehicle 1, which is embodied in this example as a sports car, that has a filter device 2 for the purification of untreated gas. Here, the filter device 2 is a constituent part of a non-illustrated tank system and is arranged in the region of a tank vent. Here, according to the invention, the filter device 2 is of modular construction and has a filter housing 3 and an auxiliary filter housing 4. At least one filter element (not shown in any more detail) is disposed in the filter housing 3, while an auxiliary filter element (likewise not denoted in any more detail) is arranged in the auxiliary filter housing 4.

The auxiliary filter element which is disposed in the auxiliary filter housing 4 is connected in a communicating fashion by a connecting line 5 to the filter element which is arranged in the filter housing 3, with the filter arrangement in the filter housing 3 being connected, on the side facing away from the connecting line 5, to a non-illustrated fuel tank. In particular during re-fueling of the motor vehicle 1, that is to say during the filling of the fuel tank, air which is contained in the fuel tank is compressed as a result of the filling with fuel, and the air can be discharged via the filter device 2. The air which is laden with hydrocarbon constituents therefore flows first through the filter element in the filter housing 3 and subsequently through the connecting line 5 and finally through the auxiliary filter element in the auxiliary filter housing 4. A diffusion process of this type naturally also takes place in a motor vehicle 1 which has been shut down for a relatively long time.

Both the filter element in the filter housing 3 and also the auxiliary filter element in the auxiliary filter housing 4 preferably have activated charcoal, which is capable of adsorbing the hydrocarbon constituents which have diffused out of the fuel tank and which are contained in the escaping air. During operation of the motor vehicle 1, the motor vehicle consumes the fuel, as a result of which a vacuum is generated in the fuel tank as a result of the tank cover being closed; this leads to ambient air being sucked in through the auxiliary filter element in the auxiliary filter housing 4, the connecting line 5 and the filter element in the filter housing 3. Here, the suction of ambient air brings about a backflush of the auxiliary filter element and of the filter element, thereby cleaning the filter elements.

As can be seen from the FIGURE, the auxiliary filter housing 4 which contains the auxiliary filter element is arranged outside and above the filter housing 3, as a result of which valuable buffering is obtained, and in the most favorable case, a penetration of fuel constituents through the auxiliary filter element and therefore a release of fuel constituents through the auxiliary filter element, and therefore a release of hydrocarbon constituents into the environment, can be prevented. The height difference between the filter housing 3 and the auxiliary filter housing 4 is denoted here as per the FIGURE by $\Delta h$.

In principle, the spacing between the filter housing 3 and the auxiliary filter housing 4, in particular a vertical spacing between the two housings 3 and 4, should be selected such that a penetration of hydrocarbon constituents through the auxiliary filter element can be prevented in any case. Crucial for this is naturally also the length of the connecting line 5, since the length co-determines the absorption volume of the filter device 2. Here, the connecting line 5 can for example be configured as a flexible hose that connects the auxiliary filter element to the filter element in a communicating fashion.

As can be seen from the FIGURE, the auxiliary filter housing 4 is arranged in the region of an A-pillar, while the filter housing 3 is arranged in a front region of the motor vehicle 1. It is naturally also conceivable for the filter housing 3 to be arranged in a rear region of the motor vehicle 1 and for the auxiliary filter housing 4 to be arranged in a C-pillar of the motor vehicle 1. It is important here merely for the auxiliary filter housing 4 with the auxiliary filter element contained therein to be disposed higher on the motor vehicle 1 than the filter housing 3.

With reference to the sizes of the filter element and of the auxiliary filter element, it should be stated that the auxiliary filter element is preferably considerably smaller than the filter element arranged in the filter housing 3. In order to be able to adapt the filter capacity of the filter device 2 in an extremely flexible manner, it may be provided that the filter housing 3 has a plug-in frame with at least one plug-in slot in which at least one exchangeable filter element can be plugged. If a greater filter capacity is desired, then a plurality of filter elements can be plugged into the respective plug-in slots in series in the flow direction. Furthermore, the servicing of the filter device 2 can be considerably simplified by a filter housing 3 of this type since, to exchange the filter element, it is necessary merely for the latter to be removed from its plug-in slot and for a new filter element to be inserted in its place. It is naturally also conceivable for the auxiliary filter housing 4 to have a plug-in frame of this type with a plurality of plug-in slots. Here, the filter elements and the auxiliary filter element are held in the respective plug-in slot by an associated spring or by a latching connection, with it likewise being conceivable for the filter device 2 to be closed only once the filter elements have assumed their correct installation position.

The invention claimed is:

1. A motor vehicle, comprising:
   a filter device for purifying untreated gas, said filter device having a filter housing and at least one filter element disposed in said filter housing, said filter device further having an auxiliary filter housing with an auxiliary filter positioned outside and above said filter housing, said auxiliary filter, disposed in said auxiliary filter housing, having at least one auxiliary filter element connected in a communicating fashion to and in series with said filter element in said filter housing;
   a front region;
   a rear region, said filter housing with said filter element disposed in one of said rear region or said front region;
   C-pillar; and
   an A-pillar, said auxiliary filter disposed there-above in one of said A-pillar or said C-pillar.

2. The motor vehicle according to claim 1, wherein said filter device is a constituent part of a tank system, with said at least one filter element and said at least one auxiliary filter element having activated charcoal for filtering hydrocarbon constituents.

3. The motor vehicle according to claim 1, further comprising a flexible connecting line connecting said auxiliary filter in a communicating fashion to said filter element disposed in said filter housing.

4. The motor vehicle according to claim 1, wherein said filter housing has a plug-in frame with at least one plug-in slot formed therein into which said at least one filter element can be plugged thus being an exchangeable filter element.

5. The motor vehicle according to claim 4, wherein said filter device has a further element selected from the group consisting of springs and latching connections, said at least one filter element is held in said plug-in slot by said further element.

6. The motor vehicle according to claim 1, wherein a spacing between said filter element and said auxiliary filter element is selected such that a penetration of hydrocarbon constituents through said auxiliary filter element is prevented.

7. The motor vehicle according to claim 1, wherein said at least one filter element is an adsorber element.

8. The motor vehicle according to claim 6, wherein said spacing is a vertical spacing.

* * * * *